Nov. 1, 1966 R. WELLS 3,282,774
METHOD AND APPARATUS FOR MAKING MULTI-LAYERED
OR SELECTIVELY THICKENED MOLDED
PULP ARTICLES
Filed Feb. 5, 1964 2 Sheets-Sheet 1
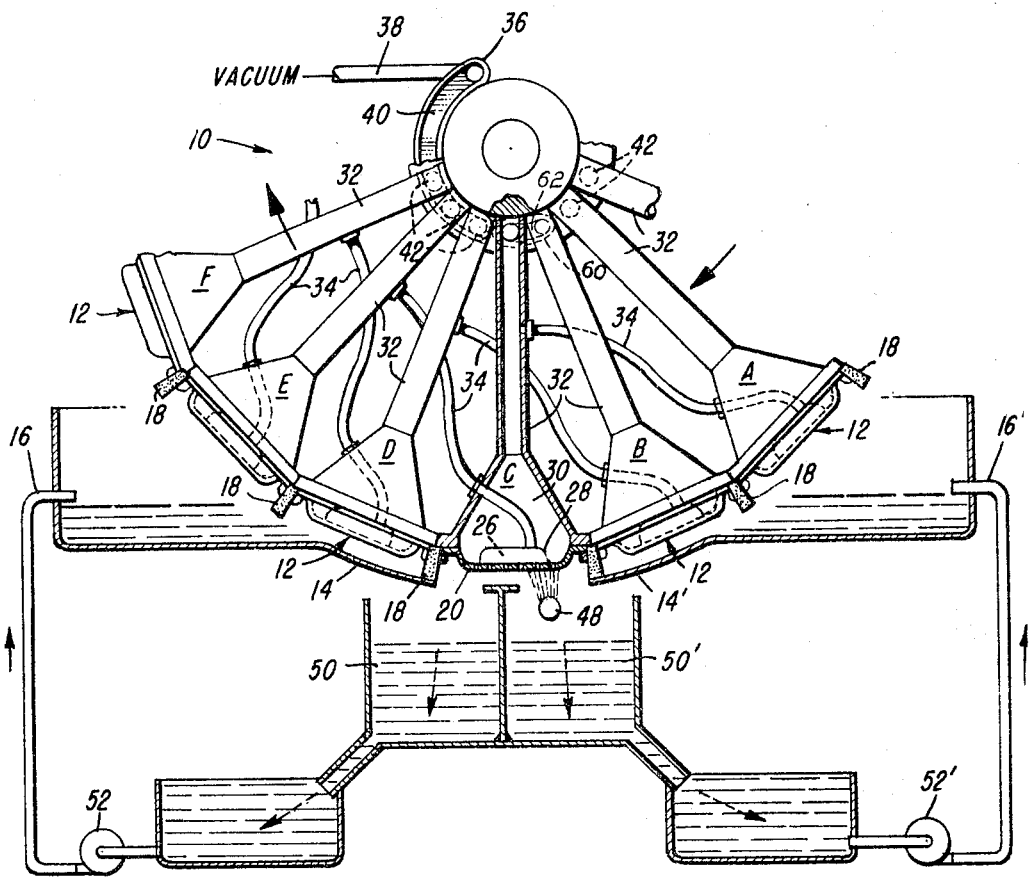
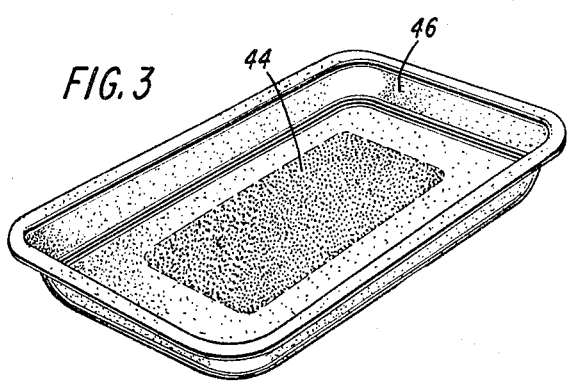
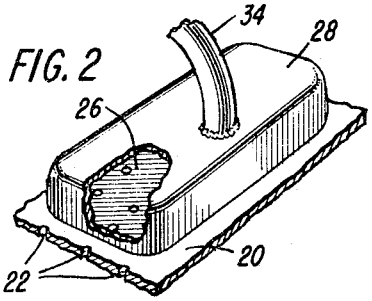
INVENTOR
ROGER WELLS
BY KARL W. FLOCKS
ATTORNEY

INVENTOR
ROGER WELLS

BY  KARL W. FLOCKS
ATTORNEY

United States Patent Office 3,282,774
Patented Nov. 1, 1966

3,282,774
METHOD AND APPARATUS FOR MAKING MULTI-LAYERED OR SELECTIVELY THICKENED MOLDED PULP ARTICLES
Roger Wells, Stamford, Conn., assignor to Diamond International Corporation, a corporation of Delaware
Filed Feb. 5, 1964, Ser. No. 342,691
15 Claims. (Cl. 162—219)

This is a continuation-in-part of application Serial No. 320,465, filed by Roger Wells on October 31, 1963, now abandoned.

The present invention relates to a method and apparatus for making molded pulp articles, and more particularly to such a method and apparatus for making multi-layered or selectively thickened molded pulp articles.

It has long been recognized as desirable in the art of making molded articles, to make articles of two or more different pulp slurries. Such an article could have many desirable advantages such as being less expensive since the base lamination could be made of a cheaper slurry and have thereon a surface or finished lamination of a more expensive pulp in selected and desirable areas. Also, in certain types of articles, it may be desirable to put on layers of different types of pulp for reasons of strength, coloring, appearance, absorptive properties, etc. It may also be desirable to apply two layers of the same type of pulp, but to utilize different stock consistencies to obtain a particular formation.

It has also been recognized as desirable in certain instances to form molded pulp articles having a differential thickness, i.e. having a thickened cross-section in certain desirable areas. One example of articles having two layers where one layer is limited to a specific area or where a specific area is merely thickened from the remainder of the article would be a rectangular tray for packaging wet foods such as chicken or fish wherein there would be built into the center of the tray a thick absorbent pad to catch the juices. After disposition of this absorbent pad, the conventional amount of highly sized stock to give a rigid non-absorbent backing would be applied. In end use, the absorbent pad first built-up in the center would absorb the free juices from the food and the rest of the tray could then be sized to a greater degree than is presently conventional to provide the strength and rigidity for a stronger-than-normal tray. Another example would be to make an article with heavy side walls to provide improved strength, rigidity, appearance, and/or economy.

In the past, attempts to provide thickened or laminated pulp molded articles have utilized the separate molding of individual layers which were then combined into a final article. This, of course, involves considerable transference of individual layers and also requires a duplication of molding equipment and the necessity of a separate laminating apparatus.

It has also been attempted to provide thickened areas in a pulp molded article by utilizing batch type molds which were deposited in a pulp slurry where a shielding device was utilized in conjunction with the mold which bodily shielded the mold from a particular slurry at a desired time. Such shielding devices were required to be mechanically reciprocated or, alternatively, the mold had to be reciprocated. Besides requiring the highly undesirable aspect of batch molding which is slow, difficult and expensive, these devices also required a mechanical reciprocating device which made the system even more complex and expensive.

It is, therefore, an object of the present invention to provide a pulp molding method and apparatus which is capable of forming a plurality of plys of a molded pulp article in a selected area or of forming thickened areas of a molded pulp article and which method and apparatus obviates the disadvantages of the prior art, such as indicated above.

It is another object of the present invention to provide a method and apparatus for high production use suitable for forming articles of molded pulp of variable thickness.

It is a further object of the present invention to provide a method and apparatus for making articles of laminations of molded pulp in which the types of the molded pulp are separately maintained.

It is another object of the present invention to provide an apparatus for forming pulp articles having selected thickened areas which apparatus is simple and inexpensive to construct and yet is simple and inexpensive to operate.

It is another object of the present invention to provide a workable method and apparatus applicable to the current production machines for making a molded pulp article in plural layers wherein one layer is limited to a specific area of the article.

It is another object of the present invention to provide a method and apparatus for molding a pulp article which is thicker in special areas to provide improved strength, rigidity, appearance, and/or economy.

Other objects and the nature and advantages of the instant invention will be apparent from the following description taken in conjunction with the accompanying drawings wherein:

FIG. 1 is a sectional view, of an apparatus in accordance with the present invention;

FIG. 2 is an isometric view, partly broken away, of a detail of the apparatus of FIG. 1;

FIG. 3 is an isometric view of a product produced on the apparatus of FIG. 1;

Figure 4:
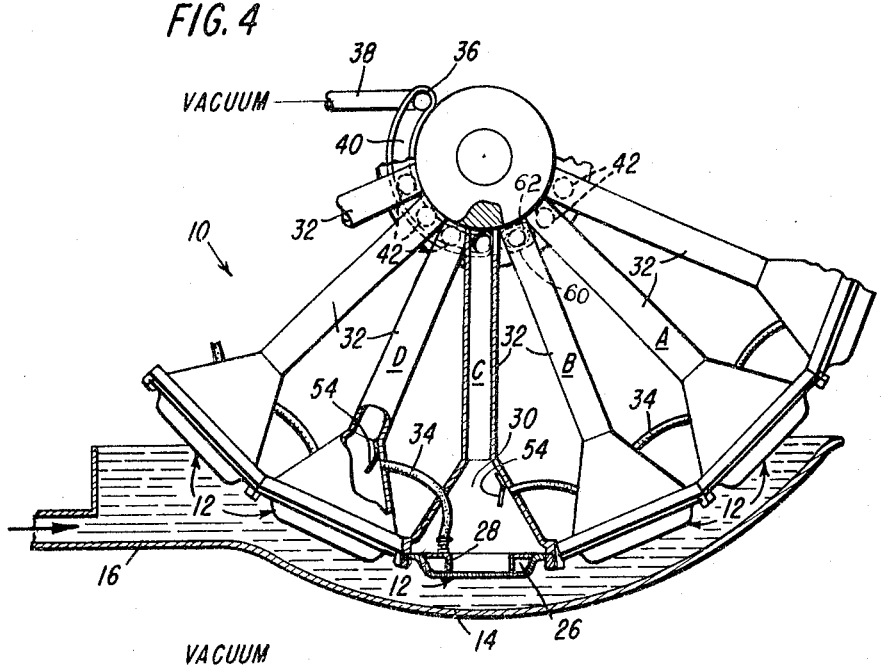
FIG. 4 is a sectional view similar to FIG. 1 showing another embodiment of the present invention.

Referring now to the drawings, wherein like reference characters are used to designate like or corresponding parts throughout the several views, there is shown in FIG. 1 a revolving molding drum 10 having a plurality of pulp molds 12 at spaced positions thereon about the periphery of the drum 10. A curving molding vat 14 is provided in essentially complementary facing relationship to the pulp molds 12 of the drum 10. Depending upon the number of different layers or plys desired on the product, the vat may be divided into separate sections, each to contain a separate pulp slurry for each ply desired. Hence, in FIG. 1 two vat sections are provided, 14 and 14' each having a pulp slurry inlet 16 and 16', respectively. As the drum 10 rotates in a clockwise direction as indicated by the arrows, each mold 12 is first submerged in the pulp slurry of vat 14' and later submerged in the pulp slurry of vat 14. During such immersion the pulp molds 12 have vacuum applied thereto through hollow passageways in a manner which is described in greater detail below.

Between each pulp mold 12 is provided a resilient wiper blade element 18, each of which is attached to the drum 10 between the pulp molds and which project radially outwardly to contact the complementary curved bottom of the vat 14. These wiper blade elements 18 are described in greater detail in my co-pending application Serial No. 301,371, filed August 12, 1963.

Figure 5:
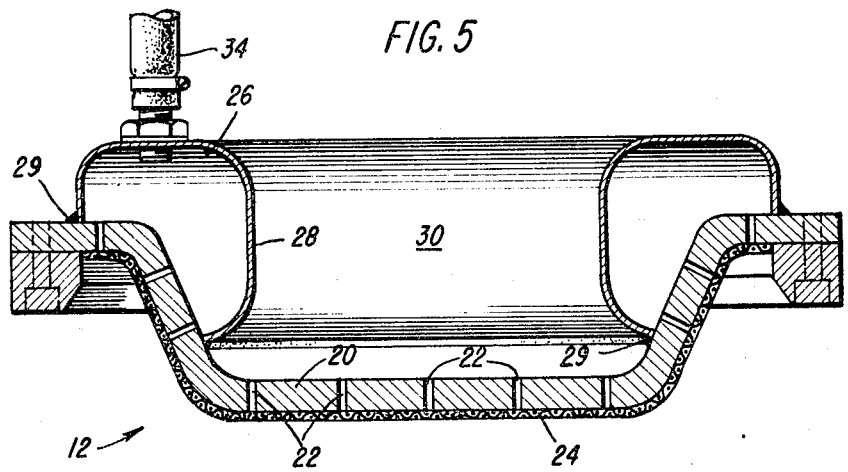
FIG. 5 is a sectional view of a mold used in the apparatus of FIG. 4.

FIG. 5 shows one example of a pulp mold 12 in accordance with the present invention, such mold being used in the embodiment of FIG. 4. The pulp mold 12 comprises a perforated molding plate 20 shaped complementary to the shape of the article desired, such as is well known in the art. Molding plate 20 has passing therethrough a plurality of holes 22 through which vacuum may be drawn. On the outer face of the molding plate 20 is provided a screen 24 against which the pulp deposits as vacuum is drawn, such as is well known in the art. The mold of the present invention differs from any known in the prior art in that separate molding areas are provided on the face of the molding plate 20 by separating the space behind molding plate 20 into separate chambers. For example, in the mold shown in FIG. 5 a first chamber 26 is provided and is defined by a wall 28 which serves to separate first chamber 26 from a second chamber 30. In mold 12 of FIG. 5, the first chamber 26 extends peripherally about the mold to form an annuloid and the chamber 30 corresponds to the space behind the center of the mold.

Conversely, in the embodiment of FIG. 1, the first chamber 26 is provided behind the center of the mold 12 and the second chamber 30 extends peripherally about the first chamber 26, such chambers being separated by wall 28 which defines chamber 26. FIG. 2 illustrates wall 28 contacting the molding plate 20 and thereby defining the first chamber 26 from the second chamber 30 in accordance with the embodiment of FIG. 1. As indicated in FIG. 5, the wall 28 may be attached to molding plate 20 in any air-tight manner, such as by a weld 29.

Each mold 12 is provided at the end of a spoke 32 of the drum 10. The spokes 32 are hollow and vacuum is drawn or transmitted therethrough to the mold 12 to effect deposition of pulp on the mold screen 24, such as is conventional in the art. However, because of the separate chambers 26 and 30, vacuum drawn through a single spoke 32 serves only to draw pulp against only one molding area of the mold and leaves the other sections free. In order to draw pulp against another molding area of a particular mold each spoke 32 is connected by a conduit 34 which passes into another chamber behind another mold. The conduits 34 also serve to transmit vacuum to the mold. Thus, for example, in FIG. 1 the spoke 32 of step C connects directly with chamber 30 of the mold 12 at the end of that spoke 32 of step C while a conduit 34 extends from spoke 32 of step C to chamber 26 of the mold 12 at step A. Similarly, the chamber 26 of the mold 12 at step C is connected by another conduit 34 to the spoke 32 of step E. In a similar manner in the embodiment of FIG. 4, the chamber 30 of step C is connected to a source of vacuum via a hollow spoke 32 of step C. Chamber 26 of step C, however, is connected to vacuum via a conduit 34 and spoke 32 of step D.

A regulating vacuum port box 36 is provided at the hub of the drum 10 and adjacent the inner end of the spokes 32. The vacuum port box 36 is connected directly to a source of vacuum via pipe 38. The vacuum port box 36 essentially comprises a circular plate with a semi-circular opening 40 provided therein. As the spokes 32 rotate, each in turn contacts solid plate until it reaches the area of the port box provided with the opening 40. At that point vacuum connection is initiated between the hollow spoke 32 and the opening 40 of the port 36 through an axially directed opening 42 provided at the inner end of each spoke 32.

Immediately in front of the vacuum port box 36 on the hub of the drum 10 is an air pressure port box 60 provided with an opening 62, similar but smaller than the vacuum port box 36 and its opening 40. The air pressure port box is connected directly to a source of low air pressure via a pipe (not shown). Before any particular spoke 32 reaches the opening 40 of the vacuum port box 36, it first passes opening 62 of the air pressure port box 60 at which point air is forced down the spoke 32 and out the holes 22 of the mold plate 20.

Thus in FIG. 1 when the spoke 32 reaches step D, the opening 42 of the spoke 32 contacts the semi-circular opening 40 of the vacuum port box 36 and air is sucked out of the spoke. This suction is carried through the connecting conduit 34 to chamber 26 of the mold 12 at step B, because conduit 34 enters the separate compartment 26, which in turn is fastened to the center of mold 12 at step B. This effects the application of vacuum through the holes 22 in the center of the mold 12 at step B. This in turn draws the pulp stock in vat 14' against the area of the mold surface adjacent only chamber 26. Pulp will deposit in the center of the mold and will form an article such as is shown in FIG. 3; if vat 14' contains a very free absorbent stock, the article will have an absorbent center ply 44. In the meantime, air from the air pressure port box 60 is forced down the hollow spoke 32 at step B into the chamber 30 and out the mold holes 22 around the periphery of the mold, thereby preventing formation of any pulp deposit from the vat 14' about the peripheral portions of the mold 12; in the absence of such low-pressure air being blown out of the mold, some stock deposit would occur on the mold adjacent the chamber 30 due to the static pressure of the stock in the vat.

As the drum advances, the stock in vat 14' drops through the end of the vat 14' into reservoir 50' to be recirculated via pump 52'. Thus only the stock which has formed in the center of the mold remains held to the mold by suction.

If desired, a deckle shower 48 may be installed between the two sections 14 and 14' of the vat so that any loose pulp which has formed adjacent chamber 30 and is not held by vacuum through chamber 26 can be showered off.

As the drum continues to rotate a spoke 32 moves from the deckle shower at step C to the second vat 14 at step D. At this step the vacuum continues to be drawn and forms the second layer 46 of the article which layer may be of regular furnish, over the entire mold 12 including the pad 44 which has previously been built up. Thus, at step D vacuum for chamber 30 is drawn through the spoke 32 at step D while vacuum for the chamber 26 is drawn through the spoke at step F via a conduit 34 between the spoke 32 at step F and the chamber 26 at step D. Since vacuum is being drawn through both chambers, 26 and 30, at step D while the mold 12 is submerged within the pulp slurry within vat 14, the second layer 46 of the article will be provided uniformly over the entire mold surface. In the same manner as previously discussed, stock in vat 14 escaping from the vat falls into reservoir 50 where it is recycled by pump 52 through stock inlet 16 and into the vat 14. As fresh stock is needed it may be added to the reservoirs 50 and 50'.

In the embodiment of FIG. 4 it is desired to produce an article having only a single layer with thickened portions around its outer edges. In such a case only a single vat section 14 is necessary which contains only a single pulp slurry. As the drum 10 rotates, vacuum in the first chamber 26 is initiated as the mold 12 reaches step B. At this time, vacuum is applied to chamber 26 of the mold at step B through a spoke 32 at step C via a conduit connected from the spoke 32 at step C to the chamber 26 at step B. Simultaneously, low pressure air is forced through the hollow spoke 32 at step B from the air pressure port box 60 and through the mold holes 22 adjacent chamber 30 to prevent any deposition of pulp in the center of the mold. As the drum continues to rotate the same mold 12 to step C, vacuum continues to be applied through chamber 26 via the spoke at step D, but also low pressure air is cut off and vacuum is then applied through chamber 30 via the spoke at step C. Since vacuum continues to be applied to both areas after the mold has left the pulp slurry, the vacuum is applied to the sides of the mold 12, i.e. adjacent chamber 26, for the time period that three spokes are in the vat 14 as compared with the time that only two spokes are in the vat 14 for the other area of the mold, i.e. adjacent chamber 30.

FIG. 4 also shows a check valve 54 mounted at the mouth of the conduit 34 in such a manner that when the article, after having been molded, is transferred from the mold with a blow-off, as is conventional, the blow-off air will not go through the conduit 34 into the chamber 26 adjacent an article which is at a station preceding the transfer station.

While FIGS. 1 and 4 show the vacuum being connected to two spokes and one spoke in advance respectively, it can be connected to three or four or any desired amount of spokes in advance depending upon how many spokes are in the vat at the same time and what additional time it is desired to use in molding the additional amounts of stock adjacent the first chamber. In addition, although the drawing shows the conduits 34 to be curved, these conduits may be of any shape; however, such conduits must be rigid enough to prevent collapse under a vacuum. A flexible tubing such as three-quarter inch diameter polyethylene has been found useful for such conduits. In addition, it is not necessary that each individual mold be connected to a preceding spoke since all the molds on one spoke could be connected to a main pipe which in turn would be connected to a preceding spoke. The conduits may also pass to a subsequent rather than a preceding spoke.

Vacuum to the conduits 34 could be regulated in another manner such as by connecting such conduits 34 to a separate source of vacuum such as a secondary port box. The vacuum port box may be provided with a plurality of openings 40 arranged in different manners to obtain any desired deposition. Any other type of vacuum regulating means may be utilized to control the vacuum to particular chambers at a desired point in travel of the mold and for desired lengths of time or such control may be effected with a single vacuum port box.

Although the drawings show molds having only two molding areas, it is understood that there is no limit to the number of chambers which may be provided behind the molds to produce products having a particular configuration of differential cross-sectional thickness.

The apparatus of the present invention may be utilized in particular to form a plurality of layers in different areas of the mold and in such a case would be utilized in conjunction with the invention of my co-pending application Serial No. 301,371 filed August 12, 1963.

While the invention has been described and shown as a vertical drum revolving on a horizontal axis, it will be understood by those skilled in the art that the invention also contemplates a drum placed horizontally and revolving about a vertical axis. Rotation of the drum is preferably continuous in direction with an intermittent stop-and-go period. If desired, other systems, rather than a continuous rotating drum with molds about the periphery, may be used.

It will be obvious to those skilled in the art that various changes may be made without departing from the scope of the invention and therefore the invention is not limited to what is shown in the drawings and described in the specification but only as indicated in the appended claims.

What is claimed is:
1. A method of pulp molding comprising:
 (a) passing a series of pulp molds through at least one pulp slurry in a pulp slurry containing vat;
 (b) applying vacuum to a first selected area of each of said molds through a first path as each said mold passes a particular point in its travel;
 (c) applying vacuum to a second selected area of each of said molds through a second path independent of said first path as each said mold passes a second point in its travel;
 said applications of vacuum, for different molds at different points of travel, being drawn through a common path and simultaneously both through said first path to a said selected area of one mold and through a said second path to a different said selected area of another mold; and
 (d) adding fresh pulp to said pulp slurry vat.

2. A method in accordance with claim 1 wherein vacuum is applied to said first selected area after said mold has been submerged in said pulp slurry.

3. A method in accordance with claim 1 wherein said vacuum application in said first selected area is maintained after said vacuum application in said second selected area has been initiated.

4. A method in accordance with claim 3 wherein each of said pulp molds are withdrawn from the last of said at least one pulp slurry while said vacuum is being applied to both said first and second selected areas.

5. A method in accordance with claim 1 wherein said molds pass through at least two separate slurries.

6. A method in accordance with claim 5 wherein said vacuum applied to said second selected area is initiated when said mold is in contact with the second of said separate slurries.

7. A method in accordance with claim 6 wherein said vacuum applied to said first selected area is maintained after said vacuum application in said second selected area has been initiated.

8. A method in accordance with claim 1 further comprising blowing low pressure air through said second selected mold area while applying vacuum to only said first seletced mold area.

9. In a pulp molding apparatus comprising: a pulp molding drum; means for rotating said drum; a plurality of pulp molds on the periphery of said drum; a pulp slurry vat in facing relationship with the periphery of said drum and through which said molds pass, said vat having at least one pulp slurry inlet; and means to apply vacuum through said molds; the improvements comprising; said molds each having a first selected area and a second selected area; means behind each said mold to separate said first area from said second area; and said vacuum applying means comprising a source of vacuum, a first vacuum transmitting means for supplying vacuum to said separate first mold area in each said mold, a second vacuum transmitting means for supplying vacuum to said separate second mold area in each said mold, and vacuum regulating means to allow vacuum to reach said first transmitting means for each said mold as that mold passes a particular point in its peripheral travel and to subsequently allow vacuum to reach said second transmitting means for each said mold as that mold passes a second point in its peripheral travel.

10. An apparatus in accordance with claim 9 wherein; said second vacuum transmitting means for each mold comprises a molding drum spoke; said first vacuum transmitting means for each mold comprises a conduit connected from said first mold area to a drum-spoke of another mold; and said vacuum regulating means comprises a vacuum port box at the hub of said drum.

11. An apparatus in accordance with claim 10 wherein said conduit connects to the spoke of a preceding mold.

12. An apparatus in accordance with claim 9 wherein said vat has at least two inlets and wherein said molds pass through at least two separate slurries.

13. An apparatus in accordance with claim 9 further comprising low air-pressure applying means for providing air pressure to said second mold area while vacuum is applied only to said first selected mold area.

14. A pulp molding apparatus comprising: a series of pulp molds; means for passing said series of pulp molds through at least one pulp slurry; a pulp vat for containing said at least one slurry; each of said molds having a first selected area and a second selected area; and a means for supplying vacuum to each said selected area of each of said molds at a different point during the travel of each said mold.

15. An apparatus in accordance with claim 14 wherein said means for supplying vacuum to each selected areas of each mold comprises a source of vacuum, a first pipe for supplying vacuum to said separate first area in each said mold, a second vacuum transmitting pipe for supplying vacuum to said separate second area in each said mold, and vacuum regulating means for allowing vacuum to reach said first selected area of each said mold as that said mold passes a particular point in its travel and for subsequently allowing vacuum to reach said second selected area of that said mold as it passes a second point in its travel through said at least one pulp slurry.

References Cited by the Examiner
UNITED STATES PATENTS 1,984,019  12/1934  Hawley _____ 162—383

DONALL H. SYLVESTER, *Primary Examiner.*

JOHN H. NEWSOME, *Assistant Examiner.*